H. N. PIERCE.
SPOOL MACHINE.
APPLICATION FILED MAR. 18, 1918.

1,365,540.

Patented Jan. 11, 1921.
9 SHEETS—SHEET 3.

Inventor
Henry N. Pierce
by
Attorneys

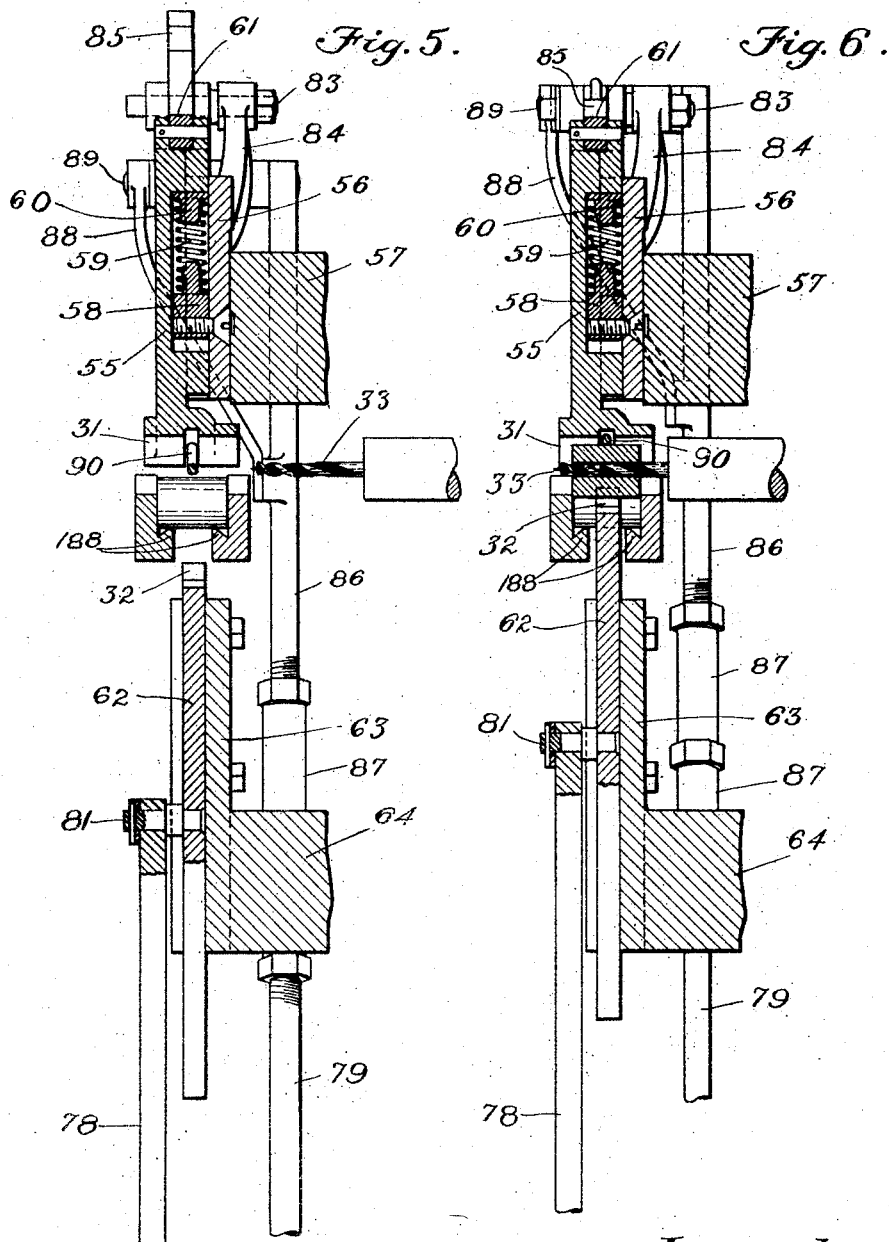

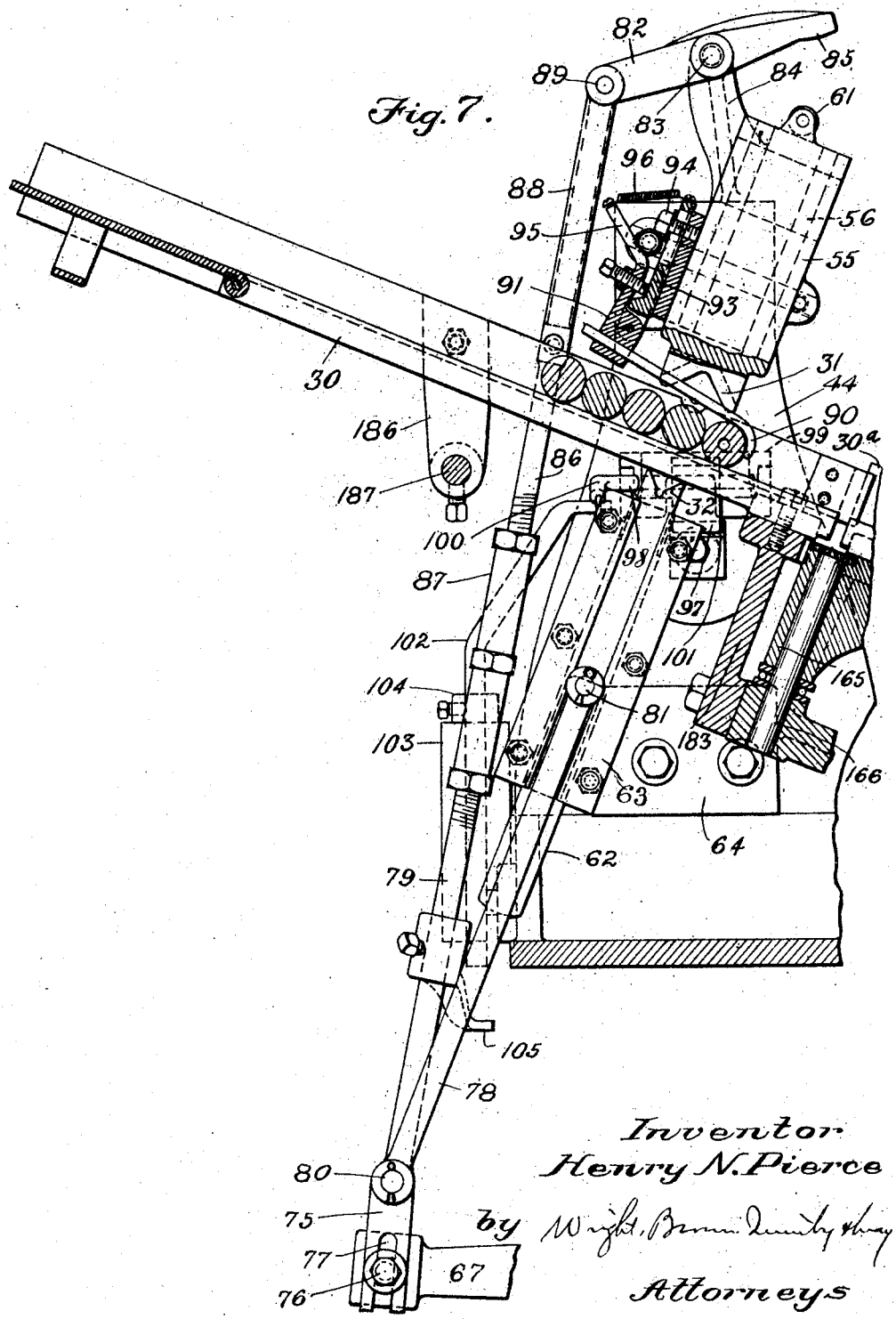

H. N. PIERCE.
SPOOL MACHINE.
APPLICATION FILED MAR. 18, 1918.

1,365,540.

Patented Jan. 11, 1921.
9 SHEETS—SHEET 6.

Inventor
Henry N. Pierce
by Wright, Brown, Quinby & May
Attorneys

H. N. PIERCE.
SPOOL MACHINE.
APPLICATION FILED MAR. 18, 1918.

1,365,540.

Patented Jan. 11, 1921.
9 SHEETS—SHEET 7.

Inventor
Henry N. Pierce
by Wright, Brown, Quinby & Hay
Attorneys

H. N. PIERCE.
SPOOL MACHINE.
APPLICATION FILED MAR. 18, 1918.

1,365,540.

Patented Jan. 11, 1921.
9 SHEETS—SHEET 9.

Inventor
Henry N. Pierce
By Wright, Brown, Quinby & May
Attorneys

UNITED STATES PATENT OFFICE.

HENRY N. PIERCE, OF SOUTH LINCOLN, MAINE, ASSIGNOR, BY MESNE ASSIGNMENTS, TO RODERICK J. MacGREGOR, OF LINCOLN, MAINE.

SPOOL-MACHINE.

1,365,540.

Specification of Letters Patent.    Patented Jan. 11, 1921.

Application filed March 18, 1918. Serial No. 223,098.

*To all whom it may concern:*

Be it known that I, HENRY N. PIERCE, a citizen of the United States, residing at South Lincoln, in the county of Penobscot and State of Maine, have invented new and useful Improvements in Spool-Machines, of which the following is a specification.

The present invention relates to spool machines of the character shown in my prior Patent No. 701,081 granted May 27, 1902; such machines being organized to act upon spool blanks, which have already been cut to approximately correct length and usually rough turned to cylindrical form, so as first to bore a central longitudinal hole in the blank, and then to deliver the blanks one by one to turning centers which support and turn the blank in proximity to forming and end facing cutting tools, formed, arranged and operated to shape the cylindrical body and the end flanges of the finished spool, and to trim the ends thereof to exactly correct length.

My main objects are to increase the speed of feeding and turning the blanks, and to prevent damaging of the blanks by the boring and forming tools, thus increasing the production of marketable spools and decreasing their cost. A secondary object is to improve the quality of the product by eliminating objectionable vibrations which in prior machines have resulted in making the spools rough and not uniform in size. The effect of the latter object contributes to the accomplishment of the object first named, of securing more rapid production of finished perfect spools.

These objects are accomplished by means fully described in detail in the following specification, with special reference to one embodiment of the invention, and particularly pointed out in the claims; which may be generally and briefly described as comprising a dogging device arranged to insure placement of the blank, prior to being bored, in exact axial alinement with the boring tool or bit, and a trip associated therewith to prevent entrance of the bit into the blank in case the latter should accidentally be so far out of place as to make impossible its engagement with the dogging device in the intended manner; a transferring mechanism occupying a location between the axis of the centers by which the blank is turned while being formed, and the delivery end of the raceway which conducts the blanks thereto, such mechanism being and operating approximately in the line of the raceway and containing improvements which enable it to be moved more rapidly than other mechanisms for the same purpose heretofore used, and substantially without setting up objectionable vibrations; the provision of capacity for lateral movement of the delivery end of such raceway and of said transferring mechanism, and a connection for causing the same to move laterally in unison with that one of the turning centers which moves toward and away from the other center in taking the blanks and releasing the finished spools; and mechanism for moving the head carrying the spool forming knives provided with means for absorbing and eliminating objectionable secondary vibrations, thereby preventing "chattering" of the knives while in contact with the work, even when operating at higher speeds than any heretofore made use of in commercial practice.

The invention consists in the means above set forth for the purposes stated; and in the embodiments thereof hereinafter particularly described, in connection with the drawings, together with all novel features of construction, arrangement, and operation of the same, and all equivalents containing the fundamental principles thereof as set forth in the claims.

In the drawings, which show a spool machine wherein I have embodied the inventions hereinbefore outlined and hereinafter particularly described and claimed, Figure 1 is an end elevation and partial cross section of so much of the machine as is necessary to illustrate such inventions.

Fig. 5 is a sectional view on line 5—5 of Fig. 1, enlarged in scale, showing the parts represented in the position as shown in Figs. 1 and 3.

Fig. 6 is a view similar to Fig. 5 but showing the parts in the same position as indicated in Fig. 4.

Fig. 7 is a side elevation similar to Fig. 1, but with parts broken away and shown on a larger scale, of the dogging device.

Figure 10:
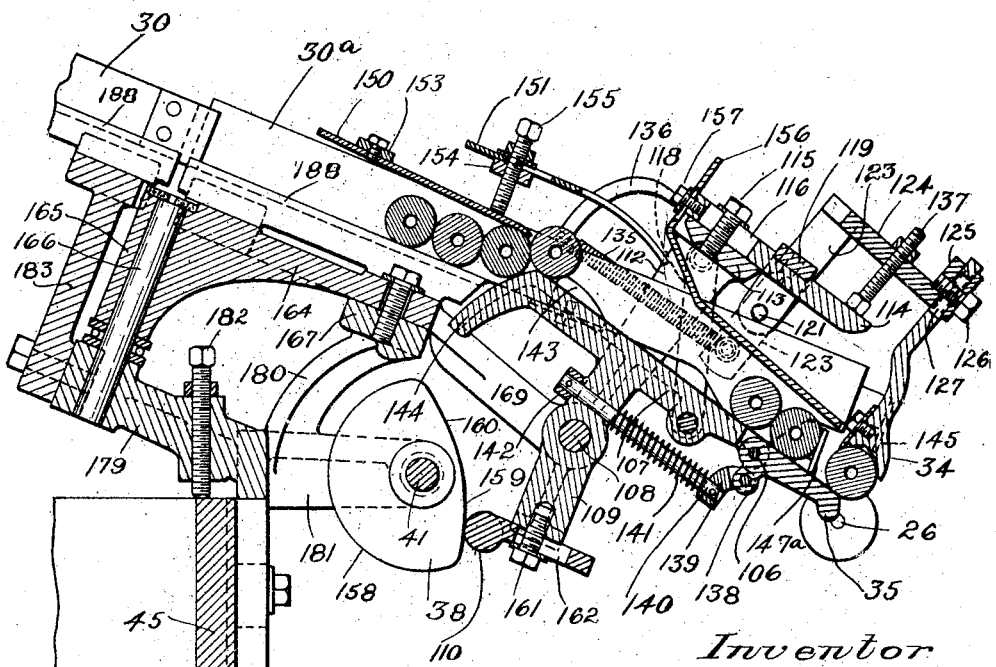
Figure 11:
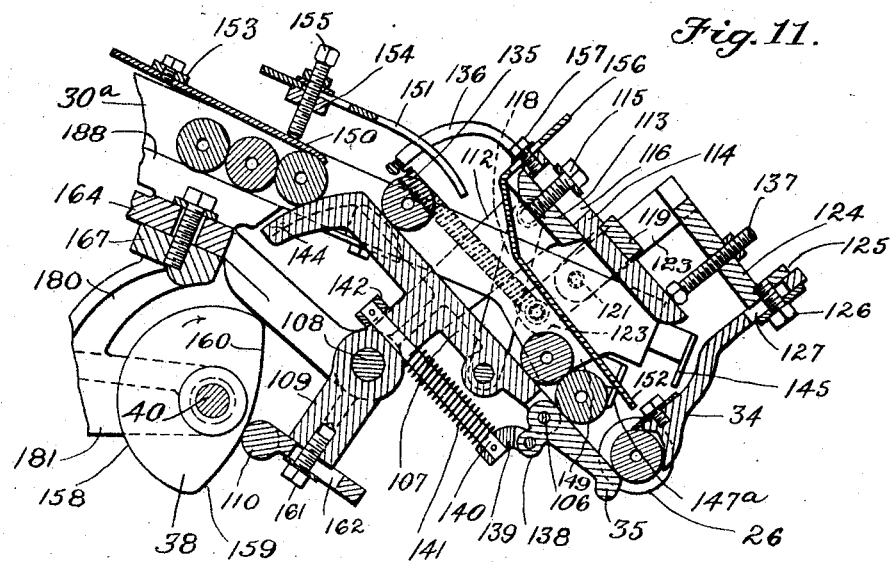
Figure 12:
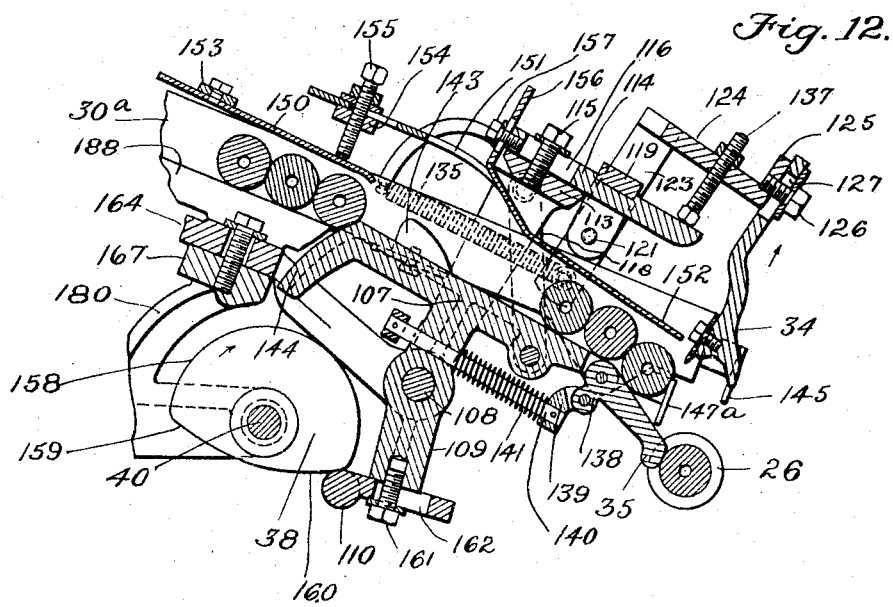

Figs. 10, 11, and 12 are similar views showing the transferring mechanism in different positions successively occupied in the course of its cycle of movements.

Figure 13:
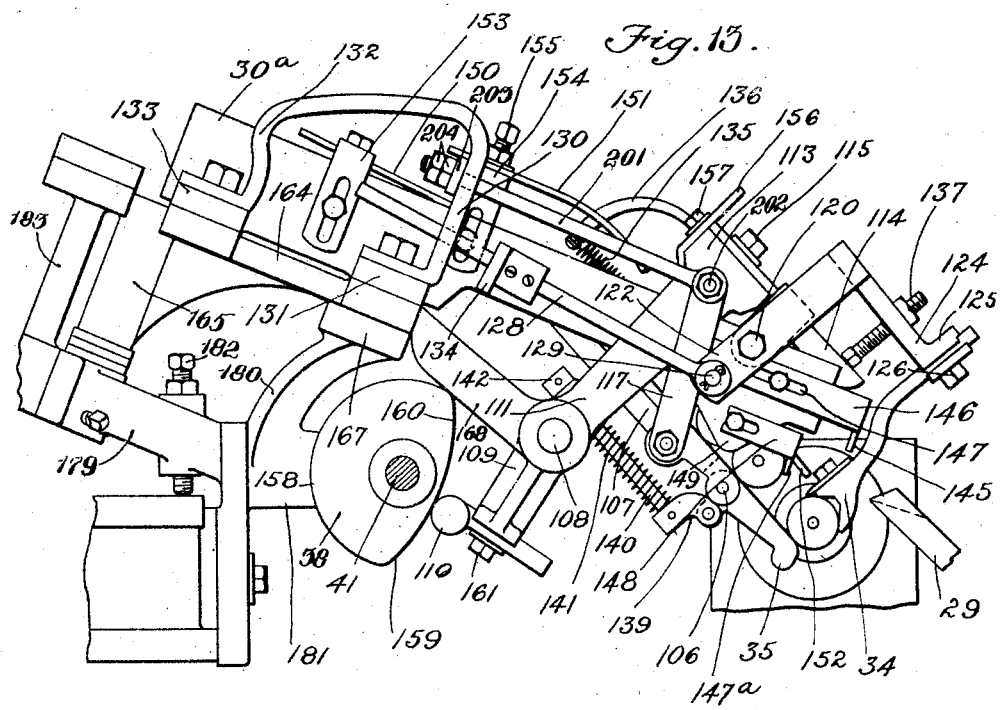

Fig. 13 is a side elevation of the same mechanism represented as being in the position shown in Fig. 11.

Figure 9:
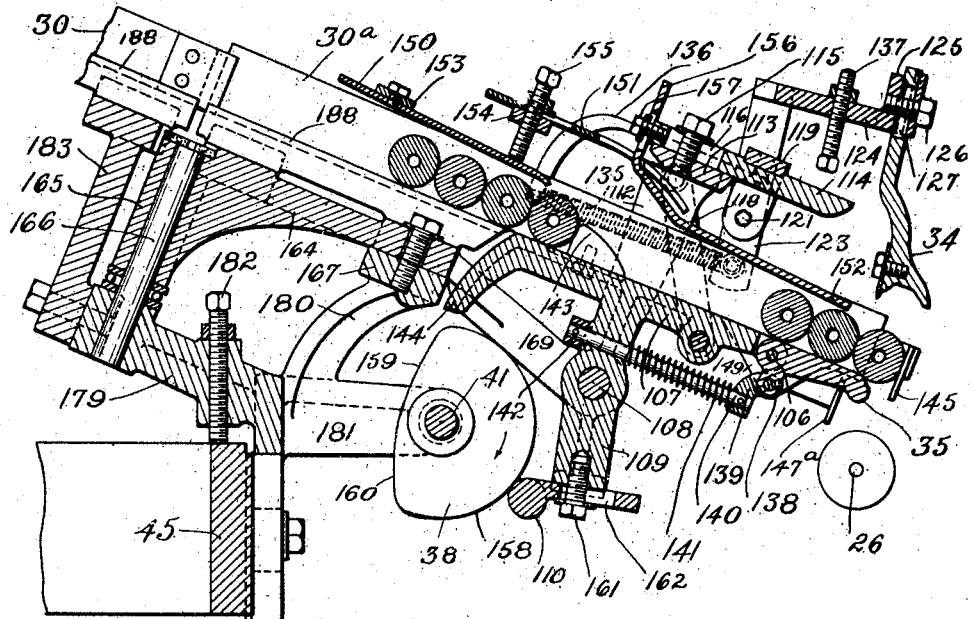
Fig. 9 is a sectional view of the delivery end of the raceway and of the transferring mechanism.
Figure 14:
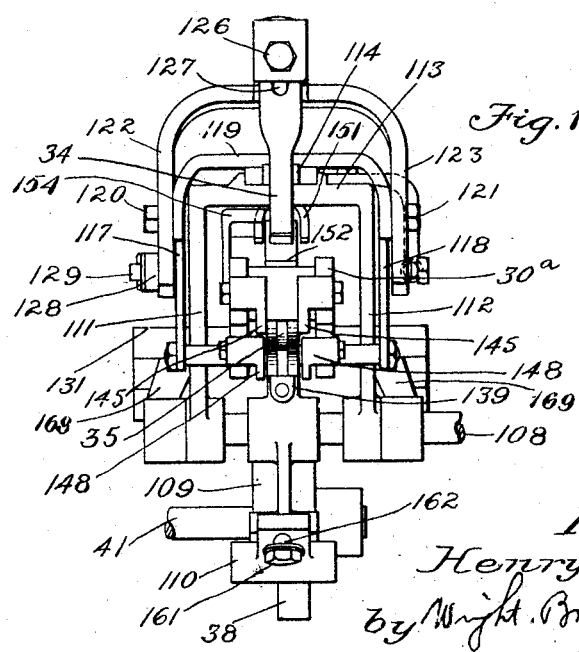

Fig. 14 is a front elevation as viewed in the line of the raceway of the transferring mechanism represented as in the position shown in Fig. 9.

The same reference characters indicate the same parts in all the figures.

Figure 1:
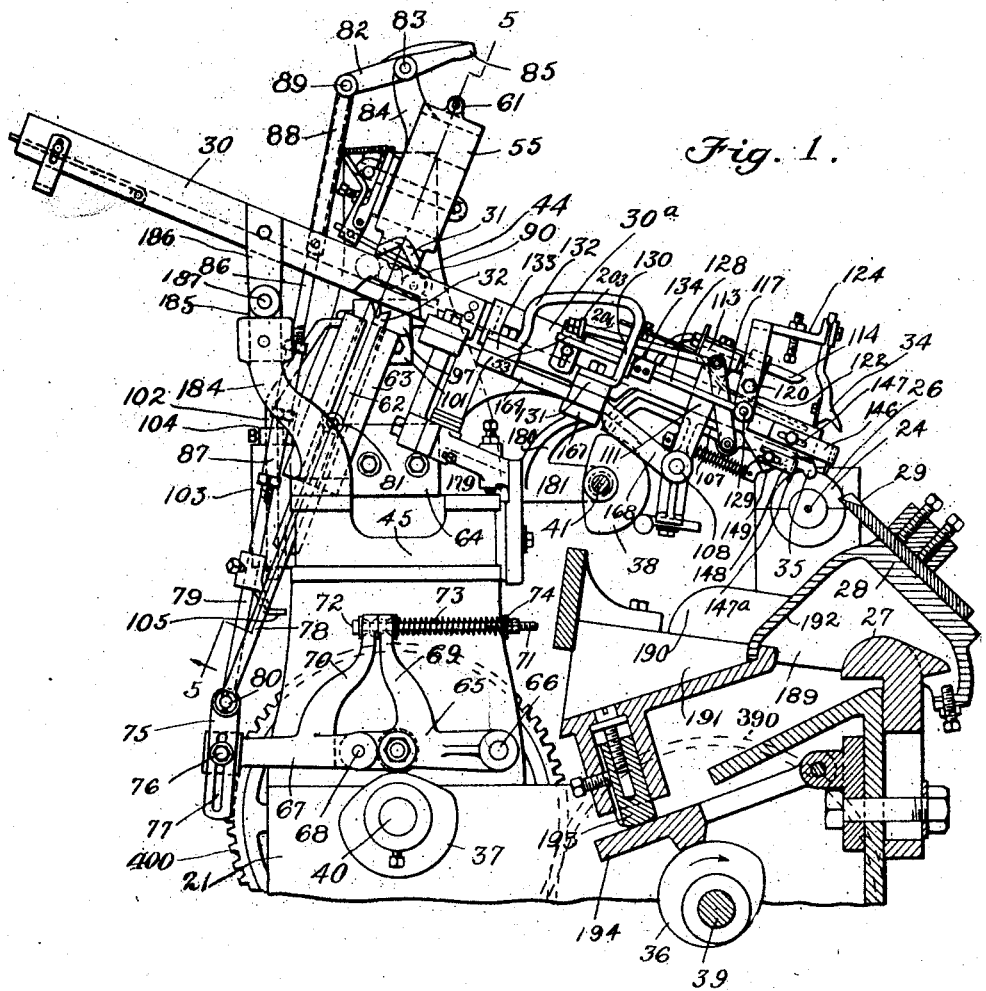

Reference is first directed to Fig. 1 as showing comprehensively the relationship of the several parts of my invention. 21 represents the bed of the machine, which is adapted to be supported on the floor of the shop, or on a bench, and may have legs as represented in my prior Patent No. 701,081. This bed supports bearings 22 (Fig. 2) in which is mounted the live spindle 23 for rotating or turning the blanks, such spindle carrying a so-called live center adapted to engage and support the blank, and other bearings 24 in which is mounted an endwise movable shaft 25 carrying the complemental so-called dead center 26. On the bed there is also mounted in an adjustable manner a bearing 27 whereon is placed an oscillating head 28 carrying the knives or forming tools 29, these last named parts being so placed that oscillation of the head in the manner presently to be described, brings the knives toward the axis of the centers and against the side of the spool blank, and then away from the latter after the spool has been formed.

The blanks are ordinarily cylindrical wooden blocks having a length slightly greater than the length of the finished spool and a diameter slightly larger than the finished diameter of the spool heads, and being without any central bore. They are conducted by an inclined raceway 30, in which they are placed by any suitable means, human agency or automatic means as desired, so that they rest on their cylindrical sides and roll by gravity down the raceway toward the centers. In their course along the raceway, the blanks are grasped and positioned by a dogging device consisting of jaws 31 and 32 on opposite sides of the axis of a boring bit 33 (Figs. 1, 5, and 6) which bores or drills a central longitudinal hole from end to end of the blank. After being released by the dogging device, the blanks travel to the end of the raceway, where they are grasped by jaws or gripping devices 34, 35 of a transferring mechanism, which carries them singly directly from the raceway into a position between the centers, and holds them there until they have been engaged by the centers; the transferring mechanism then returning to take the next blank.

Figure 2:
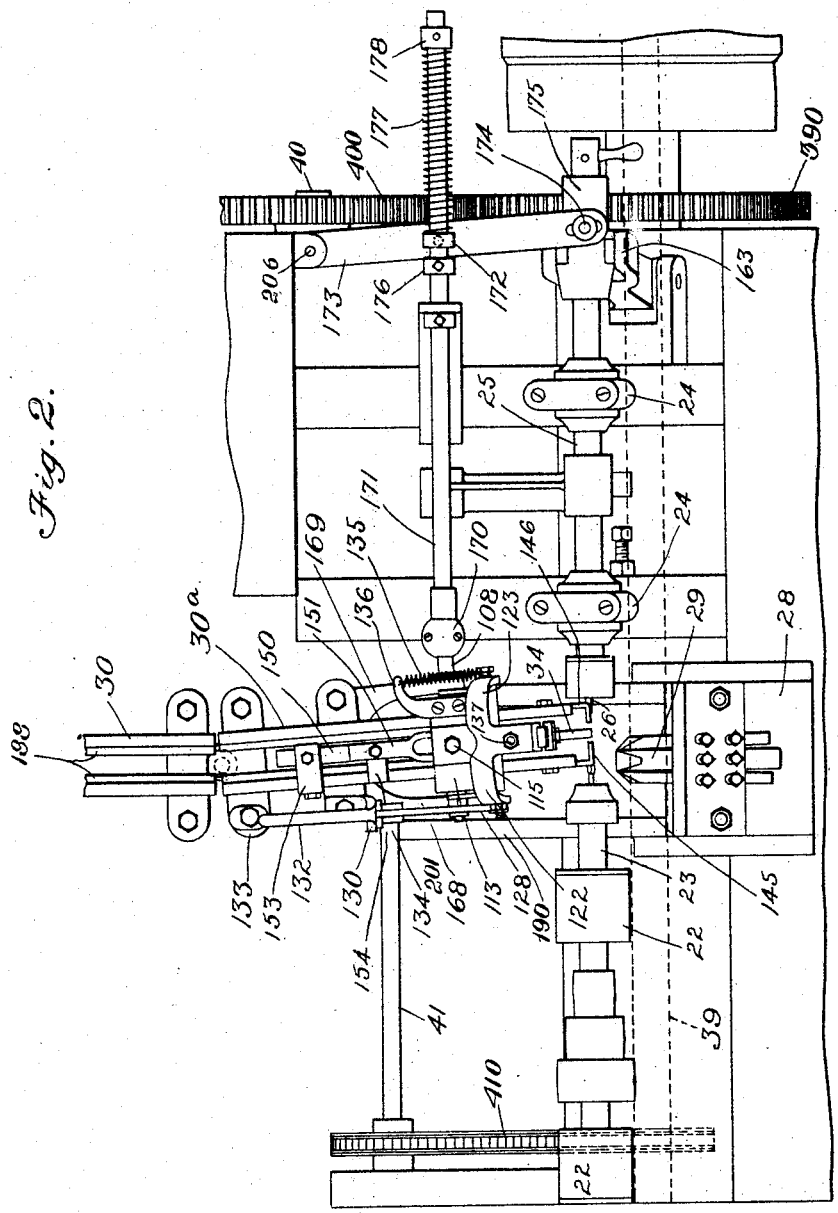
Fig. 2 is a plan view as seen at right angles to the line of the raceway of part of the machine.

The means for operating the tool-carrying head, dogging device, and transferring mechanism, above briefly outlined, comprise cams 36, 37, and 38 mounted on shafts 39, 40, and 41, respectively. In the particular machine here illustrated shaft 39 is the main shaft and carries a pulley to which power is delivered by a belt. The shaft 40 is driven by shaft 39 by gears 390 and 400 at one end of the machine, and the shaft 41 from the main shaft by a chain 410 at the other end of the machine (Figs. 1 and 2).

*Dogging device.*

Figure 8:
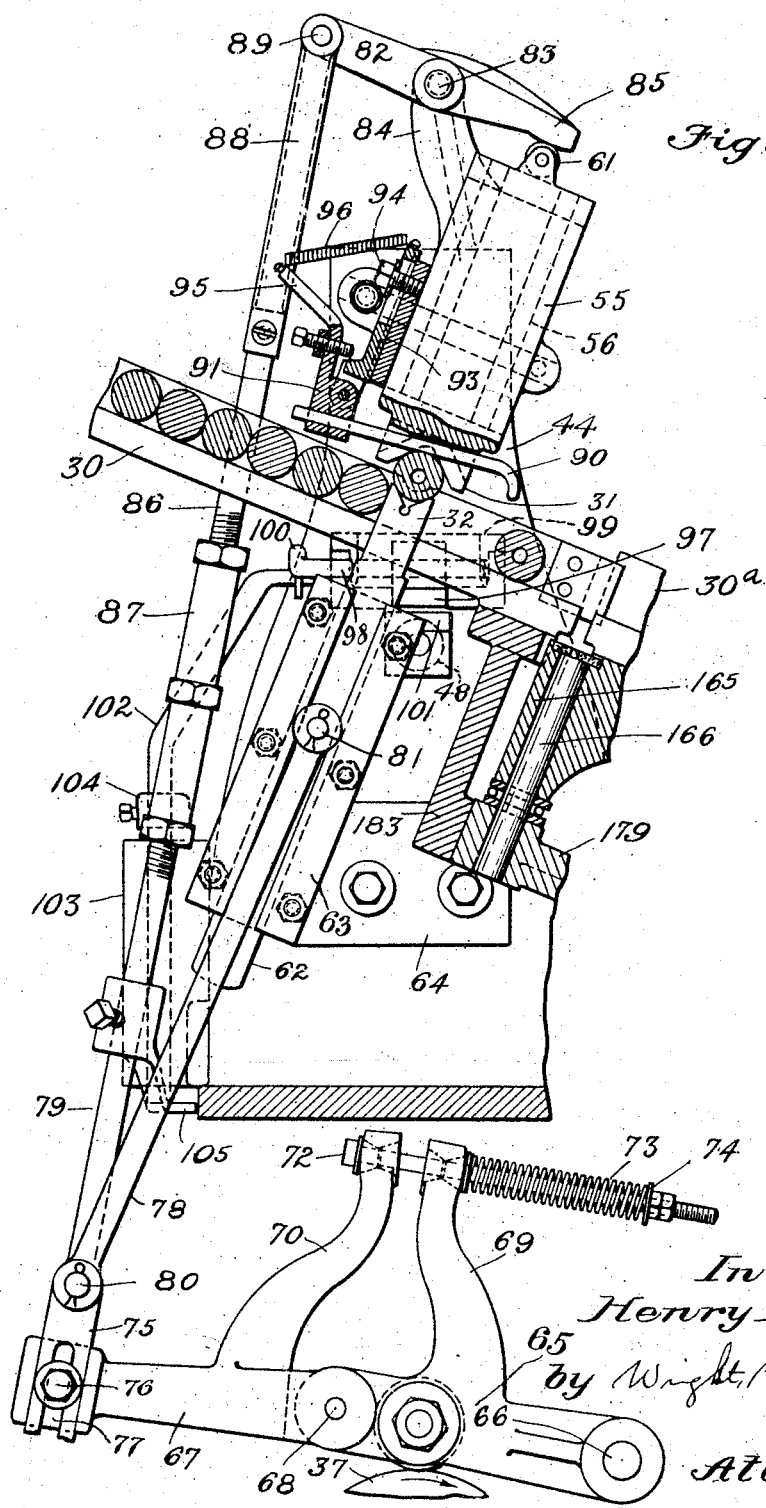
Fig. 8 is a similar view showing the parts in the position in which they are represented in Figs. 4 and 6.

Reference is directed to Figs. 3, 4, 5, 6, 7, and 8 in connection with Fig. 1 for complete illustration of this device. The jaws 31 and 32 are arranged, when not engaged with a blank, respectively above and below the raceway, or in other words on opposite sides of the path in which the blanks travel, and the lower jaw is adapted to pass through the raceway and to lift blanks into contact with the upper jaw, as shown in Figs. 6 and 8. When thus held the blank is axially alined with the bit 33. The latter is carried by a spindle 42 mounted to turn in bearings 43 in a head 44 which is mounted on a beam 45 which forms part of the machine frame and is supported by any convenient means upon the bed 21. Shaft 42 carries a pulley 46 by which it may be driven through the agency of a belt from a countershaft, and the shaft is movable endwise in the bearings so as to carry the bit into, and withdraw it from the blank. It is thus moved by a lever 47 engaged with a rod 48 parallel to the shaft 42, sliding through bearings in the head 44 and carrying an arm 49 whereon is a bearing box 50 surrounding the shaft and abutting at one end against the pulley 46 and at the other end against a collar 51 on the shaft, said arm being adjustable by the agency of nuts 52 at opposite sides of the same on a threaded portion 53 of the rod. The rod also carries a stop 54 adapted to limit endwise movement of the bit by striking one of the uprights of the head 44, such stop being adjustable on the rod. Lever 47 is preferably similar in construction, arrangement and mode of operation to a corresponding lever shown in my prior patent referred to provided for the same purpose, and may be operated by the same means as shown in said patent. It is sufficient for the purposes of the present description that it be understood that the machine is equipped with suitable means for advancing and withdrawing the boring bit in proper time with the operation of the dogging jaws; and as such means are fully shown in Fig. 6 of my prior patent, a repetition of the illustration and description of the whole of such means in this specification is not necessary.

The dogging jaws are operable to place a blank of any diameter, from the largest to the smallest which the machine will take, with its axis in exact alinement with the bit. To this end both jaws are movable toward and away from the line of the bit and mechanism is provided for so operating them. Jaw 31 is formed on a plate 55 having a rib which fits and slides on a guide 56 attached to a beam 57 which is mounted on the head 44. A part of the plate 55 is cored out as shown in Figs. 5 and 6 to provide a chamber wherein is located an abutment block 58 connected to the guide 56, a spring 59, and a pusher 60 which transmits the thrust of the spring to the jaw plate and tends to raise the latter, withdrawing the jaw from the raceway. On the upper end of the jaw plate is mounted an anti-friction roll 61 to receive force applied by the operating device presently described. The complemental jaw 32 is formed on the end of a bar 62 sliding in a guideway 63, which is fixed to the head 44 by a bracket 64, or may be mounted on the beam 45.

For operating the jaws there is provided a lever 65 mounted on a pivot 66 and carrying a roll which is acted upon by the cam 37. An arm 67 is pivoted to the lever 65 by a hinge pin 68. Lever 65 and arm 67 have coacting arms 69 and 70, respectively, through which passes a rod 71 having a head 72 which bears against the outer side of the arm 70, and on which is mounted a spring 73 bearing against the opposite side of the arm 69, and reacting against an adjustable abutment 74 on the rod. This spring normally holds the arms 69 and 70 in contact but is adapted to permit separation thereof in the manner shown in Fig. 8. This entire structure forms in effect a yieldable lever which moves as a unit under the force applied by the cam, but is adapted to yield in case the parts acted upon are arrested so as to be incapable of movement. From now on I will refer to this device as a whole as a lever, without regard to the specific terms hereinbefore used to define the constituent parts thereof. On the outer end of the lever is adjustably mounted a bar 75, by means of a bolt 76 passing into the lever through a slot 77 in the bar, and to said bar are connected links 78 and 79, conveniently by means of the same pivot 80. The first named link is joined by pivot stud 81 to the bar 62, and the second link is joined to a rock lever 82 pivoted at 83 on an arm 84 which projects from the guide 56, said rock lever having an arm 85 arranged to bear on the roll 61. The link 79 is in fact made in three parts, namely, a rod to which the numeral 79 is applied, a second rod 86 in line therewith, and a coupling nut or sleeve 87 connecting the rods 79 and 86, said rods being oppositely threaded at their ends and engaging complemental threads in the coupling sleeve, whereby adjustment of the length of the entire link is made possible. The part shown as 88 is a strap connected to the rod 86, as shown in Figs. 5 and 6 and holding one end of the pin 89 which passes through the end of rock lever 82, the other end of this pin being held by the rod 86. The purpose and effect of strap 86 are thus to prevent binding or cramping of the pivot pin in the rock lever.

It will be seen that this operating mechanism will first raise the dogging jaw 32 and then bring the rock lever arm 85 to bear on the jaw 31. By proper adjustment of the bar 75 and of the coupling 87, these jaws may be brought to a position where the center of any circle tangent to their engaging surfaces is exactly alined with the boring bit. Preferably the adjustment is made so as to grip the smallest blank which the machine is designed to take. If any blank thus engaged should be of larger size than that indicated, the lever 65 will yield as soon as the blank is gripped and permit the cam to complete its rotation, without either stopping the machine or crushing the blank or damaging any of the parts. The upper jaw 31 accommodates itself automatically to the size of the blank, for the link 79 and rock lever 82 will cause it to approach as near to the bit axis as the jaw 32 approaches but no nearer. The practical effect, where a large number of blanks of the same size are operated on is that the jaw 31 is not shifted perceptibly at all, because the lack of positive connection between it and the rock lever arm 85 prevents it from being withdrawn when the arm rises, and it engages the guide 56 with sufficient friction, which is reinforced by the spring 59, to prevent it from dropping when the blank has passed on. Thus when each new blank of the same size is presented, the arm 85 merely descends to press on the jaw 31 and causes the latter to apply force on the blank equal to that which is applied in the opposite direction of the jaw 32. When a larger blank is encountered, the jaw 31 is displaced by the pressure transmitted through the blank, before the roll 61 encounters the arm 85, and the latter arrests this displacement when the axis of the blank is in line with the bit. On the other hand, the jaw 31 is moved down by the rock lever to meet a smaller blank, when the axis of the latter is in the same position. The force transmitted from one part of the yielding lever to the other part through the spring 73 is sufficient to overcome friction and to cause both jaws to press with equal force on the blank.

A gate 90 is provided to arrest the blanks rolling down the raceway so that one of them will stop in line with the jaws. This gate is an arm projecting from a block 91 pivoted to a plate 93 which is adjustably secured by a clamp screw 94 to the side of the jaw guideway 56; said block having an arm 95 connected by a spring 96 with a point on the plate 93. The gate 90 occupies a slot substantially parallel to the raceway in the jaw 31 and projects over the blanks, and it has a curved end located in front of the next blank in front of that which is in line with the dogging jaws. The spring 96 tends to hold the gate so that this end obstructs such blank, and the intermediate part of the gate is above the next blank below the position to which such blank is elevated by the lower dogging jaw, as shown in Fig. 7. Thus when the blank is dogged, it displaces the gate from the next blank in front, allowing the latter to pass forward, and then when the blank is released after being bored, it permits the gate to descend and arrest said blank as soon as the latter has advanced far enough to bring another blank in line with the jaws. As the blank is not disengaged from the lower jaw until it has been returned to substantially the bottom of the raceway, the gate is always brought into the closed position before the blank has advanced to it. The peculiar construction of the gate enables it to be adjusted conformably to the blanks of larger or smaller sizes.

*Boring bit trip.*

Figure 3:
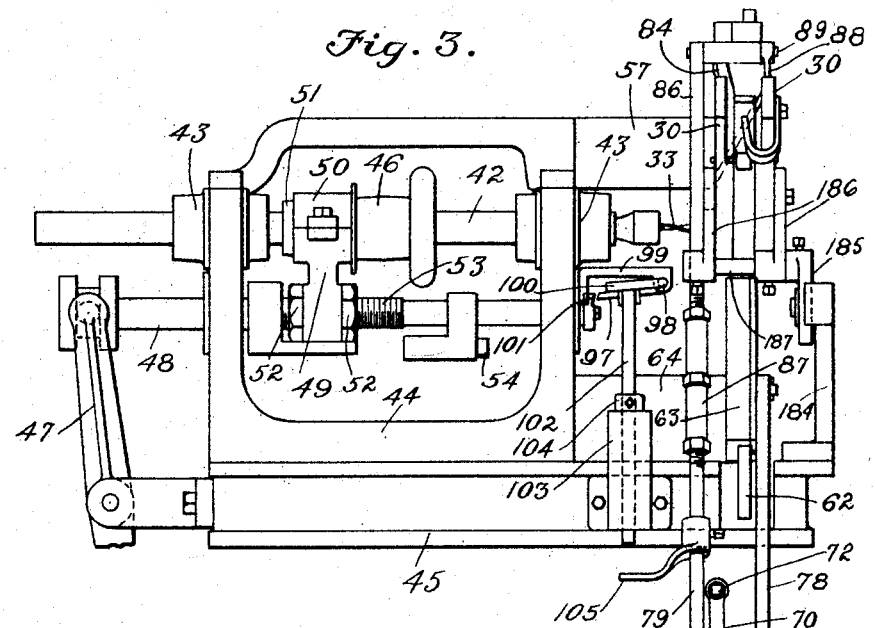
Fig. 3 is a rear elevation of that part of the machine which contains the dogging device and the associated trip.
Figure 4:
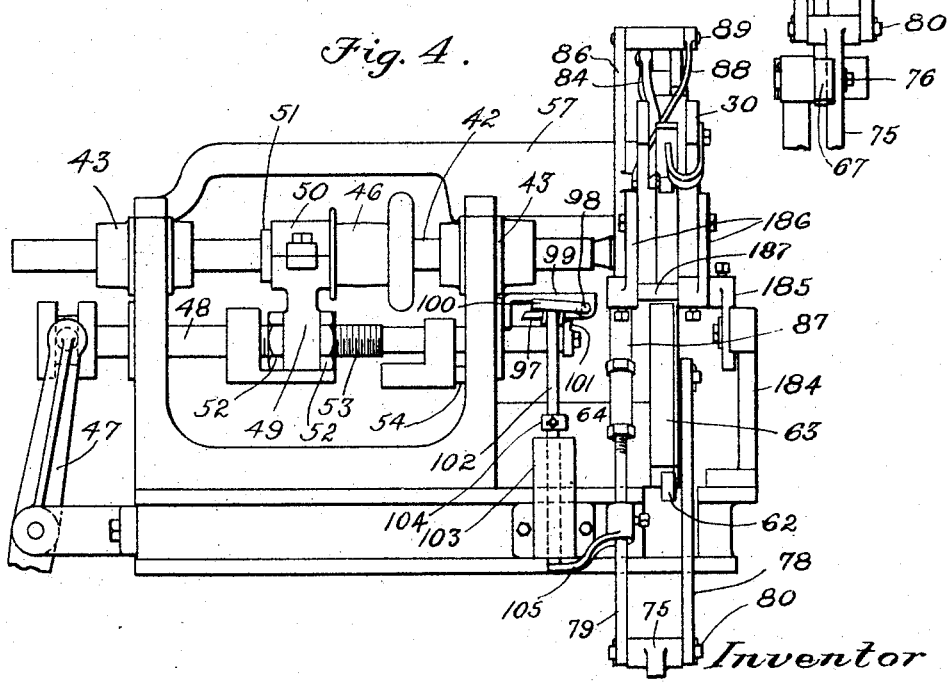
Fig. 4 is a similar view showing the movable parts in a different position.

Preferably the dogging jaws are formed with V shaped notches in their adjacent sides or ends so that each makes tangent contact with the sides of the blank at two points, and the notch in one of the jaws, for instance 31, is wider at the mouth than the entire width of the other jaw, in order as far as possible to prevent the blank from being gripped in any other position than the desired central position. As it is impossible to prevent absolutely all chance of a blank being accidentally caught between the points or corners of the jaws rather than fully in their notches, I provide a means for preventing action of the boring bit in case the blank should be thus caught. This means is shown in Figs. 3 and 4 and comprises a latch 97 on a rock shaft 98 which is hung in a bracket 99 from the side of head 44, and carries a trigger arm 100. This latch is normally held by gravity with its end in the path of a shoulder 101 carried by the advancing end of the bar 48 which propels the bit shaft, and in position to arrest such bar before the bit has entered the blank at all. A rod 102 passes and is movable endwise through a guide 103 fixed to the beam 45 and its upper end lies beneath the trigger 100 and supports the same with the latch in the position described, which is that shown in Fig. 3. A collar 104 on the rod rests on the guide and holds the rod in this position, wherein its lower end projects slightly below the guide. On the link 79, previously described, there is fixed adjustably a trip 105 adapted to raise the rod 102 when the blank is properly engaged, far enough to raise latch 97 clear of the shoulder 101. This trip may be differently set for blanks of different sizes so that it will always displace the latch when the blank is properly dogged. The movement necessary to be given to the latch for this purpose is very slight, while the distance from the end of rod 102 to the point at which the trip stops when a blank is improperly gripped is so much greater, that said latch is not displaced in that case. Thus the blanks are prevented from being bored at any other point than exactly axially, and are thus saved from accidental spoiling. The yielding character of lever 47, previously referred to, and plainly shown in my prior patent, makes it possible to arrest the bit by the latch 97 as described.

*Transferring mechanism,* (Figs. 1, 9, 10, 11, 12.)

This mechanism comprises grippers or jaws 34 and 35, previously mentioned, which are located at the end of the raceway above the line of the blank turning centers and on respectively opposite sides of the path in which the blanks travel. The gripper 35 is pivoted on a pin 106 carried by a holder 107 which is mounted on or attached to a shaft 108, and is provided with an arm 109 carrying an adjustable contact piece 110 which bears against the cam 38. That part of the holder which carries the gripper 35 lies between the sides of the raceway and has an upper surface forming the bottom of the terminal part of the raceway and adapted to be placed in line with the adjacent part of the raceway bottom when in the position shown in Figs. 1 and 9. Said holder is one part of a gripper carrier of which another part includes arms 111, 112 which embrace the raceway, passing outside of the opposite sides thereof and being mounted upon the shaft 108. The upper ends of these arms are connected by a crosspiece 113 on which a plate or bar 114 is fastened in an adjustable manner by means of a clamping bolt 115 passing into the crosspiece through a slot 116 and bearing against the outer or upper side of the bar 114. Tie bars or straps 117, 118 connect the outer ends of the arms 111, 112, respectively, with the body of the holder 107 in order to prevent displacement of these arms, which are structurally separate from said body, with respect to the latter. On the plate 114 is secured a saddle or yoke 119, the ends of which are extended down on opposite sides far enough to afford support for pivot studs 120, 121 whereon are mounted the arms 122, 123, respectively, of a bifurcated lever which includes a forwardly projecting finger 124 having a lug 125 on its end, to which the gripper 34 is connected in an adjustable manner by a clamping bolt 126 which passes through a slot 127 in the shank of the gripper and is threaded into the lug 125.

A rod 128 (Figs. 1 and 13) is attached by a pivot stud 129 to the arm 122 of said yoke, and passes thence through a hole in an abutment bracket 130, through which it moves freely. This abutment bracket is secured by a bolt to a lug 131 on the raceway and has an extension 132 secured to a second lug 133 on the raceway, being provided to increase the security and rigidity of the abutment. The rod 128 carries a stop 134 which is adapted to strike the abutment 130 and to be arrested thereby at certain times so as to withdraw the gripper 34 from the complemental gripper 35, as presently described. This stop is adjustable along the rod and secured by set screws, in order to accommodate the grippers to blanks of different diameters. Attached to the other arm 123 of said yoke is a spring 135, shown dotted in Figs. 9 to 12, which is also connected to an arm 136 rigidly secured to the crosspiece 113 of the carrier. The purpose of this spring is to apply a constant force tending to move jaw 34 toward jaw 35 which may be overcome by the positive force applied in the opposite direction through the rod 128 when the stop 134 strikes abutment 130. An adjustable stop for the gripper 34 is provided in the form of a screw 137 carried by the finger 124 and adapted to abut on the extension part of plate 114. Another rod, 201, is connected to the carrier by the pin 202 which attaches link 117 thereto, and it also passes in a freely sliding manner through abutment 130, carrying an adjustable stop collar 203 backed by nuts 204 threaded on the rod, at the back of the abutment. The function of this rod and its stop is to limit the forward and downward movement of the transferrer, arresting it when the spool blank is exactly in line with the dead center, as presently hereinafter explained.

The gripper 35 is adapted to yield away from gripper 34 in order to release the blank when the transferring mechanism returns after delivering the blank to the centers. To this end gripper 35 is made as a bell crank lever having a short arm 138 to which is pivoted a finger 139 carried by a rod 140 which passes through a part of the body of the holder and is surrounded by a spring 141 which presses against said body and against the finger 139. A collar 142 fixed to the end of this rod bears on the opposite side of that part of the body through which the rod passes and serves as a stop to retain the gripper with its upper surface in line with the upper surface of the holder body 107. Yielding of this gripping member is permitted in the manner shown in Fig. 12, the spring 141 being then compressed.

The entire transferring mechanism tilts or oscillates about the axis of shaft 108 in transferring blanks, and in so doing that part of the holder body which is in the raceway bottom coacts with certain stops in feeding blanks to the gripper jaws. The first stop is comprised by blocks 143 close to the opposite walls of the raceway and between which the body of the carrier lies, these blocks being in advance of the rear end of this body far enough for the latter to support the blank which lies against the blocks as shown in Fig. 9. Furthermore the blocks are adjustable longitudinally of the raceway according to the size of the blanks so that no more than one blank of the smallest size will be thus supported at a time, and that at least room enough may be afforded to support a blank of the larger sizes. When the grippers are lowered to transfer a blank, that part of the holder which extends in rear of the stops 143, being also in rear of the shaft 108, is raised, thereby lifting the superposed blank over the stop, as shown in Figs. 10 and 11. There is a downwardly inclined finger 144 on the rear end of the holder, the rear face of which is approximately concentric with the shaft 108, which serves as a gate obstructing the path of the blanks and holding back those which lie in rear of the one which is thus lifted over the stop 143. The next stop is provided by inwardly projecting flanges 145 at the extreme end of the raceway, there being two of these flanges, one at each side of the path in which the upper gripper 34 travels, and between which the latter may pass. These flanges are formed on straps 146 which are bolted to the outer sides of the bars forming the sides of the raceway, as shown in Fig. 1, and are rendered adjustable by slots 147 through which the holding bolts pass. Somewhat similar stops 147ª are provided in rear of and below the stops 145, being formed upon slotted straps 148 screwed or bolted adjustably to the outer sides of lugs 149 depending from the raceway side bars as shown in Fig. 1. The stops 145 and 147ª, being adjustable as described, may be placed so as to arrest the endmost blank in position to be grasped by the grippers and to leave a space sufficiently wide for this blank to pass between the stops in its travel to the centers. The stops 147ª arrest the second blank during the transferring and return movements of the grippers. As these stops are each arranged in pairs, one of each pair at each side of the raceway, the gripper 35 is able to pass between them.

Guards 150, 151, and 152 are provided to overlie the blanks on and adjacent to the gripper carrier to prevent the blanks from being thrown out of the raceway by the rapid movement of the carrier. The guard 150 is a strip secured to a bracket 153 overhanging the raceway, and it holds back the blank next to the gate 144 when the latter is raised. Guard 151 is likewise a strip secured to a second bracket 154 overhanging the raceway and overlying the blank which is lifted by the rear part of the carrier over the stops 143. The same bracket 154 supports an adjustable stop screw 155 adapted to bear on the guard 150 to adjust the position of the latter toward and away from the blanks under it. The forward end of guard 151 is divided or notched to admit the rear part of the guard 152 when the transferring mechanism is in the position shown in Figs. 1 and 9. Guard 152 is mounted upon the carrier, specifically on the plate 114, by an up-turned end 156 thereof having a slot through which passes an attaching screw 157. This guard thus moves with the carrier and overlies the blanks supported on the forward part thereof, and is adjustable toward and away from the body of the carrier.

The weight of the entire transfer mechanism is so disposed that the center of gravity is forward of the rock shaft 108, whereby gravity holds the contact piece 110 against the cam, and causes the gripper jaws to descend when permitted by the cam. This cam has a circular bearing surface 158 extending through slightly more than half its circumference, with a steeply inclined descending surface 159 and a steeply inclined rising surface 160. Thus it is adapted to hold the transferring mechanism in the position shown in Figs. 1 and 9 through something more than half the entire time of one cycle of the machine, and then to lower the transferring grippers during half of the remaining time, and raise them during the balance of the cycle.

The operation of this mechanism is as follows. Assuming that the spaces intended for the reception of blanks are all occupied, as shown in Fig. 9 and that the mechanism is in the position shown in that figure, it remains in that position until the surface 159 of the cam reaches the contact piece 110. Then the holder commences to swing so as to lower the grippers. The upper gripper is lowered more rapidly than the lower gripper because it is caused to turn about the axis of pivots 120, 121, being actuated so to do by gravity and the spring 135, in addition to its motion about the axis of shaft 108. Before the endmost blank has escaped from the stops 145, the upper gripper has engaged it as shown in Fig. 10. The second blank has now passed into engagement with the stops 147$^a$ and is held back thereby so as not to interfere with the action of the grippers. Said grippers now carry the blank into the line of the turning centers as shown in Fig. 11, at which time the lowest point of the cam is beside the contact piece 110. Arrest of the grippers with the bore of the spool blank accurately alined with the live center is insured by the stop 203 on rod 201, which may be appropriately adjusted and set for that purpose. The contact piece 110 is likewise adjustable by reason of the fact that the clamping screw 161 which secures it to the carrier passes through a slot 162 in the shank of the contact piece, and thereby the carrier may be set when in the gripper-raising position to bring the rear, or blank-lifting part, of the body 107 correctly in line with the raceway to enable the blanks to roll over and upon it. During this movement of the transferring mechanism said rear or blank lifting end of the body has risen and elevated a blank over the first stop 143. Further movement of the cam reverses the motion of the transferring mechanism and raises the grippers, the lower gripper then yielding so as to pass from beneath the transferred blank. With this motion the rod 128 slides through the abutment 130 until the stop 134, which in the continuing lowering movement had been withdrawn from the abutment, brings up against the abutment, and thereupon the depending end of arm 122 is arrested, and the lever frame carrying the upper gripper is caused to rotate about its pivot axis 120—121, thus additionally raising the upper gripper. At the same time the blanks resting on the forward part of the carrier are raised until the endmost one of those remaining is lifted over the stops 147$^a$, whereupon it rolls under the now elevated upper gripper until it reaches the end stops 145. The blank which in the preceding motion had been lifted over the stops 143 has in the meantime rolled forward, and the blank in the rear thereof, which had been held back by the gate 144 now passes over and upon the carrier. The transferring mechanism thus includes not only the means for grasping and carrying a blank to the turning centers, but also a means for feeding the blanks one by one into the position to be grasped by the grippers. The stops 145 and 147$^a$ coöperating with the gripper carrier form an escapement permitting delivery of one blank at a time and preventing escape of any other blanks; while the rear part of the carrier with its gate 144, and the stops 143 act as a feeder for admitting a blank to the transfer mechanism whenever one is transferred to the turning mechanism. These parts which I have described as the feeder have an important function in holding back the blanks in the raceway from the transferrer grippers, the value of which I will now explain. It is necessary, practically, to provide a comparatively great length of raceway between the boring bit and the transferrer to serve as a receiver in which blanks are exposed to view. An attendant who watches these blanks rolling down the raceway is able to detect imperfect blanks which may have been inadvertently fed into the machine in the first place, and to remove such imperfect blanks before they have been brought to the point from which they are carried by the transferrer to the turning centers. The pressure due to the weight of these blanks exerted on the lowest one in the raceway is a force of considerable magnitude; and it is also frequently happens that the cut blanks have splinters on their edges due to the action of the saw in cutting them from a bar or rod, which cause adjacent blanks to lock together when they are forcibly pressed one against another. If the blanks were allowed to pass freely upon the transferrer, as many of them as could be accommodated on the latter, the pressure of the entire line of blanks would be borne by the end stops and the weight of all these blanks would have a tendency to retard the upward movement of the transferrer. But a more serious difficulty would arise by reason of the fact that the transferrer is steeply inclined when in its lowered position and the pressure of a long line of blanks bearing upon those carried by the transferrer would crowd some of the blanks out of line and against the overlying shield, and such blanks as have splintered ends would be spiked together in a degree. The result of all this would be to make the blank which previously rested against the stop 147ª slow to clear itself of the stop and pass over the same to the stop 145 after the transferrer had been raised, so that frequently the end blank would not arrive between the grippers in time to be grasped thereby, but the grippers would at such times travel empty to the centers and fail to deliver a blank thereto.

For these reasons the machine should preferably be so operated that not more than two of the largest, or four of the smallest, blanks are allowed to be upon the transferrer at any one time, wherefore the rear extension of the transferrer body, having the gate 144, and the stops 143 are provided so as to feed forward the blanks one at a time as fast as they are removed for finishing, holding back in the stationary part of the raceway all but the two or three blanks which are required to be on the transferrer in readiness to be grasped when required by the grippers. The feature thus explained is required on account of the high speed at which the machine is run and is a factor contributing to the result of operating the machine at a much higher speed than has ever before been obtained in machines doing commercial work of the character described.

An advantage of the construction of the transferring mechanism herein shown and described is that the gripper jaw 35 moves backward under the blank which bears against the stop 147ª in elevating such blank during the return movement; and in thus wiping against the under side of the blank, it sets the blank rotating in the direction which causes it to travel forwardly as soon as it has been raised above the stop, more rapidly than it would be impelled by gravity alone. In this machine, where speed of production is an important factor, the acceleration thus given to the blank in moving between the grippers materially contributes to the effect of surely placing the blank between the grippers during the short time that the latter remain open for that purpose.

Displacement of the raceway.

It has been previously stated that the shaft 25 carrying the dead center is adapted to move toward and away from the live center. It is so moved by any mechanism suitable for the purpose, which may be substantially the same as that shown in my prior Patent 701,081.

In Fig. 2, 163 represents one end of the arm which imparts this movement to the shaft. In moving toward the live center, the dead center pushes the blank which is held by the transfer grippers upon the live center, which enters the bore of the blank and is provided with spurs to indent the material of the blank and so apply the positive torque thereto. When the dead center is retracted there must be space enough left between it and the live center to admit the blank and to permit the finished spool, which is removed from the live spindle by a knock-off device similar to that shown in my patent, to fall away. This space is thus wider than the length of the blank. I have provided means for causing the transferring mechanism to move with the dead center so that the grippers may continue to hold the blank until the latter has been entered by the live spindle, and for the further purpose of shortening the time required for the transfer of the blanks to the centers. This means consists in providing the raceway with a terminal portion which is laterally displaceable, in supporting the transferring mechanism on such terminal portion, and in connecting said portion with the displaceable center to move therewith. Attention is directed to Figs. 1, 2, 9, 10 and 13 for illustration of these means. Said raceway terminal portion is designated 30ª and is secured to an arm 164 having a hub portion 165 which turns about a pivot pin 166. This arm also rests on a relatively fixed support 167 on which it is adapted to slide. Separated arms 168, 169 beneath and on opposite sides of the raceway are rigidly joined to the arm 164, being preferably an integral part thereof, and carry the bearings for the rock shaft 108 which carries the transferring mechanism. This rock shaft is connected by a ball and socket coupling 170 with a rod 171 passing through a lug 172 on a lever 173 which is pivoted at a fixed point 206 on the machine frame and is engaged with a pivot stud 174 on the collar or sleeve 175, fixed to the shaft 25, to which the operating arm 163 is connected. On the rod 171 at one side of the lug 172 is an adjustably set collar 176, and on the other side of the lug a spring 177 and an adjustably set abutment collar 178. By means of the collar on one side and the spring on the other, transmitting force through rod 171, the raceway terminal and transferring mechanism are shifted back and forth with the dead center. Spring 177 is provided to prevent damage by the grippers to a jammed spool, but is sufficiently stiff to give full movement to the raceway terminal in all cases except when a spool or blank becomes so lodged as to obstruct the jaws.

By reason of this connection the grippers follow the dead center when the latter withdraws from the live center, whereby they may place the blank grasped by them in the space between the centers, at the same time knocking away a finished spool if the same should adhere to the dead center, and they continue to hold the blank until the latter has been placed partly on the live center. Placement of blanks correctly on the live center in all cases is insured by arrest of the transferrer by the means already described in the position where the grippers hold the bore of the blank alined with the live center. The saving of time accomplished by this part of the invention consists in this, that the grippers may commence their transferring movement before the dead center begins to withdraw, and they need not be timed so as to wait until the dead center has entirely cleared the space for receiving the blank, nor need any more than the extreme last part of the blank transferring motion be deferred until this space has been fully cleared, as would be necessary if the grippers were not thus laterally displaceable. That is, it is not necessary to slow down the speed of the machine to the limit required if a considerable part of the transferring movement were required to take place while the space between the centers is fully opened. There is no possibility of interference between the head carrying the dead center and the transfer grippers, wherefore the latter can hold the blank for a relatively longer time than is possible in machines lacking this feature, and until the blank has become firmly engaged with the live center.

The support 167 is formed as part of a bracket bolted to the forward side of the beam 45 and provided with arms 179, 180, 181 which carry the pivot 166, the support 167, and bearings for the cam shaft 41. Arm 179 also holds an adjustable stop 182 to bear on the beam 45 and adjust the raceway vertically, and it also holds a post 183 on which the rear raceway section is supported at its forward end and by which it is alined with the terminal portion. The rear raceway portion is also supported by a post 184, a vertically adjustable bar 185 attached to said post (Fig. 3) and straps 186 connected to said bar by a rod 187. For the rest, the raceway is of common construction, consisting of bars which form the side walls and are provided with ledges 188 as shown in Figs. 5 and 6, whereon the blanks rest. Those of such bars as form the terminal section 30ª are provided with lugs, two of which are designated 131 and 133 in Figs. 1 and 13, by which they are secured to the arm 164 and the post 183 by means of bolts and being preferably slotted transversely of the raceway to permit adjustment of the bars for longer or shorter blanks.

Tool head operating mechanism.

The tool head 28 is formed with webs 189 in which are concave bearings fitting the bearing block 27 and having arms 190 connected to an extension 191, which is also a discharge chute for the finished spools and is overlapped by a web 192 on the tool head. This extension carries a foot 193 adjustable in a manner clearly shown in Fig. 1, which rests on a transmission arm 194 connected pivotally with the bed and bearing on the cam 36. The head with its extension is so far overbalanced at the rear of the bearing, that is, the side at which the cam is located, that gravity causes it to bear constantly on the cam and also causes the knives to be fed into the work when permitted by the receding surface of the cam. The novel feature in the present construction for which I claim protection, consists in the interposed transmission arm between the head and the cam, the utility of which is to absorb secondary vibrations and transmit only the rising and descending movements of the cam surface to the cutter head. I have found that without this transmission arm such vibrations are set up at high speeds, causing chattering of the knives and production of imperfect work; and that the interposed transmission arm absorbs all of the vibrations which cause this chattering and transmits to the cutter head only the smooth continuing movements which cause the knives to advance into the work and recede without chattering and therefore with production of perfect finish. This is an effect which contributes materially to the main object of the invention, which is to furnish a machine capable of a large production of perfect finished spools.

The machine here shown and described has accomplished a large increase in production. Heretofore the best result in the operation of automatic spool machines of which I have knowledge has been the production of approximately 60 finished spools per minute. Greater production has not been possible with the machines in use on account of the impossibility of operating some of the mechanisms fast enough, and of the severe vibrations set up in the attempt. With the machine here shown I have produced perfect spools to the number of 95 per minute, an increase of over 50% beyond the previous results. To get this production I have run the live spindle at a speed of 9700 or 9800 revolutions per minute and have provided ball bearings for the same to enable this speed to be maintained. The other factors contributing to this result are, first, the dogging mechanism, which not only avoids entirely spoiling the work, but also insures boring the same in the exact center, so that when the blank is finally placed on the live spindle and centered by its bore, it is in substantially perfect balance and truth.

Second, the transferring mechanism, having its grippers in the same plane with the raceway, that is, with the path in which the blanks travel, instead of offset to one side of said path as in my prior patented machine, thereby moving in a direct line from the raceway end to the blank-receiving space between the centers, and being enabled to receive the blanks and move them more rapidly than the prior transferring devices. It is also sufficiently well balanced that its rapid operation may be carried on without imparting objectionable vibrations to the spool-turning mechanism.

Third, the lateral displacement of the transfer mechanism in conjunction with the dead center, giving time for the transfer of the blanks and so avoiding any attempt to make the transferring motion impossibly rapid, and making unnecessary the slowing down of the turning mechanism to fit the limitations of the transferring mechanism.

Fourth, the means which I have provided for eliminating vibrations in the cutter head, which enable the latter to be moved at the speed indicated and so smoothly, without chattering of the knives, as to turn out perfect work.

The cams are designed and timed in accordance with well understood principles to carry out the operations in the essential sequence. The tool operating cam 36 brings the knives against and into the blank as soon as the latter has been properly engaged with the centers, thus acting during substantially three-fourths of the cycle, and then withdraws the knives during the remainder of the cycle. Before the spool has been completely finished, cam 38 causes the transferring mechanism to grasp a blank and carry it toward the centers, in time to displace the finished spool as soon as the latter has been knocked off from the live center, and to place the blank in the axis of the centers at the instant when the dead center pauses before returning toward the live center, withdrawing them as soon as the blank has securely engaged the live center. The exact timing of the dogging device is not important, provided only that it causes a blank to be dogged and bored in each cycle of the turning and transferring mechanisms.

The foregoing description has been directed to a particular machine for the purpose of illustration and not of limitation. Various modifications in structure and arrangement of the elements may be made without departing from the scope of the invention as set forth in the claims, and my claims are to be construed in the light of this explanation.

The terms heretofore used indicating relative directions may be defined thus; the side of the machine where the turning centers and cutter head are located are considered as the front, and the terms "front" or "forward," and "rear" have significance accordingly. As regards the transferring mechanism, the movement thereof with a blank toward the centers is considered as the transferring movement, and that in the opposite direction to the previous position preparatory to taking another blank is considered as the return movement.

What I claim and desire to secure by Letters Patent is:

1. A machine for making spools comprising an inclined raceway in which blanks are contained and are fed, rotatable centers adapted to support and rotate a blank and being located in a line adjacent to said raceway, and transferring mechanism for carrying blanks from the raceway to said centers and consisting of a carrier oscillatively mounted and having a part forming the blank supporting bottom of the terminal portion of said raceway, a gripper supported movably by said carrier in position to coöperate with the extremity of the latter in gripping a blank, such extremity forming a complemental gripper, and means for oscillating said carrier and thereby moving said grippers back and forth between the raceway end and the line of said centers.

2. A machine for making spools comprising an inclined raceway in which blanks are contained and are fed, rotatable centers adapted to support and rotate a blank and being located in a line adjacent to said raceway, and transferring mechanism for carrying blanks from the raceway to said centers and consisting of a carrier oscillatively mounted and having a part forming the blank supporting bottom of the terminal portion of said raceway, a gripper supported movably by said carrier in position to coöperate with the extremity of the latter in gripping a blank, such extremity forming a complemental gripper, means for oscillating said carrier and thereby moving said grippers back and forth between the raceway end and the line of said centers in a path transverse to the line of the raceway, a stop at the end of the raceway in position to arrest a blank in position to be grasped by said grippers, and a separating stop at the side of the raceway in position to permit movement of a blank past it when the grippers are in the receiving position and to arrest a blank when the grippers are in the delivering position, said stops being spaced apart on respectively opposite sides of the path of transferral of the blanks.

3. In a spool machine a raceway, an oscillatably mounted supporting bottom for said raceway having at the extremity a blank gripper, means for so oscillating the said bottom as to raise and lower said gripper, a complemental gripper associated with said bottom and movable therewith and also relatively thereto in such manner as to coöperate in gripping a blank, a stop at the raceway end arranged to arrest a blank in position to be grasped by said grippers, and a second stop below the normal line of the raceway bottom and at a distance back from the first stop wide enough to permit passage of the blank carried by the grippers between said stops.

4. In a spool machine having a raceway, transferring mechanism comprising complemental grippers, an oscillatively mounted holder on which one of said complemental grippers is mounted, a carrier for the coöperating gripper movably mounted on said holder, means for moving said holder and carrier at the same time in a path intersecting the raceway, said grippers being on relatively opposite sides of the path in which blanks travel on the raceway, and means for moving said carrier relatively to the holder whereby to separate the grippers for admitting a blank and to close the grippers upon said blank.

5. In a spool machine the combination with a raceway adapted to contain spool blanks, a holder forming a blank supporting bottom for a part of the raceway and having a gripper at its end upon which the blanks are adapted to pass, said body being movable transversely to the line of the raceway, a complemental gripper overhanging the first-named raceway and being movably connected to said body in a manner permitting it to move toward and away from the first named gripper, and means for withdrawing the first named gripper from the second named gripper when said body is in alinement with the raceway, and for causing the second gripper to approach the first gripper when the body is in course of displacement from such line.

6. A blank transferring mechanism comprising a body having a supporting surface adapted to support blanks fed thereon and having a gripping portion, a gripper complemental to said gripping portion connected pivotally to said body, means for moving said body back and forth between two positions, and an abutment arranged to act upon said gripper for displacing it from said gripping portion when the body approaches and occupies one of said positions and arranged further to cause approach of the gripper toward said gripping portion upon the body commencing to depart from said position.

7. In a spool machine an oscillatably mounted holder body having a gripping portion and being movable between two positions, means for providing blanks upon said body and gripping portion when the latter is in one position, a complemental gripper pivotally connected to said holder body and having an operating arm, being adapted to move about its pivot toward and away from said gripping portion whereby to provide a blank-receiving space and to grip blanks respectively, a fixed abutment, and means connected with said arm and guided to engage said abutment when the holder body approaching occupies one position, thereby separating said gripper from the said gripping portion, and permitting approach of the gripper to said gripping portion when the holder body departs from said position.

8. In a spool machine an oscillatably mounted holder body having a gripping portion and being movable between two positions, means for providing blanks upon said body and gripping portion when the latter is in one position, a complemental gripper pivotally connected to said holder body and having an operating arm, being adapted to move about its pivot toward and away from said gripping portion whereby to provide a blank-receiving space and to grip blanks respectively, a fixed abutment, and a rod connected to said operating arm passing in a sliding manner through said abutment and having a stop adjustably set on it in position to engage the abutment and so cause movement of the gripper relatively to the holder body when the latter approaches and reparts from one of its positions.

9. In a spool machine an inclined raceway having side bars between which spool blanks are placed, said raceway having a supporting bottom on which the sides of said blanks rest and along which they are adapted to roll, and a transferring mechanism comprising a holder or body portion oscillatively mounted and arranged to move between the bars of said raceway at the end thereof from a position in which the upper surface of said body is in substantial alinement with the raceway bottom, to a position in which said surface is more steeply inclined, and back again, a part of the body in front of the pivotal axis thereof being lowered and a part in rear of such pivotal axis being raised during the movement from the first to the second of said positions, a gripper carried by the forward end of said body in line with the blank supporting surface thereof, a complemental gripper above the first named gripper, a carrier for said complemental gripper movably connected to said body portion, and means for causing the second named gripper to be raised relatively to the first named gripper when the holder is in the first position, whereby space is provided for admission of a blank between the grippers.

10. A transferring mechanism as set forth in claim 9 and comprising in addition a stop upon the raceway adjacent to said rear part and formed to stop the blank lying upon said rear part when the latter is in its first position and being limited in height to permit lifting of said blank over the stop when said rear part passes to its second position.

11. A transferring mechanism as set forth in claim 9 having its rear end constructed to hold back blanks in rear thereof when placed in the second named position, a blank-arresting stop on the raceway side bar beside the second named psoition of said rear part, arranged to arrest the blanks when the holder is in its first position, and over which a blank is carried by the displacement of said rear part into the second position, and stops at the end of the raceway one of which is arranged to arrest the endmost blank when the holder is in the first position, and the other to pass between the endmost and the second blank and to arrest the latter when the holder is in the second position.

12. A transferring mechanism as claimed in claim 9 distinguished by arms connected with said holder and embracing the raceway and a crosspiece on said arms bridging the raceway, a yoke attached to said crosspiece, and a carrier having arms which embrace said yoke and are pivoted thereto at separated alined points, one of said arms having an extension beyond its pivot, an abutment fixed to the raceway, a rod pivoted to said arm extension passing freely through said abutment, and a stop collar adjustably mounted on said rod and adapted to engage the abutment when the holder approaches its first position.

13. A spool machine comprising coöperating centers adapted to support and rotate a spool blank, one of said centers being mounted to move toward and away from the other in engaging and releasing such blanks, a raceway arranged to conduct blanks toward said centers and having a laterally movable delivery end connected with the movable center to be shifted back and forth therewith, and transferring mechanism mounted and arranged to grasp a blank situated in the end of the raceway and to carry said blanks to a position between the centers.

14. A spool machine comprising coöperating centers adapted to support and rotate a spool blank, one of said centers being mounted to move toward and away from the other in engaging and releasing such blanks, a raceway arranged to conduct blanks toward said centers and having a laterally movable delivery end connected with the movable center to be shifted back and forth therewith, and transferring mechanism mounted and arranged to grasp a blank situated in the end of the raceway and to carry said blanks to a position between the centers, said transferring mechanism being movable substantially in the same plane with the raceway and being likewise connected with the movable center for lateral movement in unison therewith and with the delivery end of the raceway.

15. A spool machine as set forth in claim 13 in which the delivery end of the raceway is formed by a separate section, said machine including a pivot stud on which one end of the movable part of said raceway is pivotally mounted in line with the adjacent end of the rear part of the raceway, a laterally extending rod connected to said laterally movable raceway portion, and means for transmitting motion from said movable center to said rod.

16. A spool machine as claimed in claim 15 distinguished by a rock shaft carried by and with said raceway on which said transferring mechanism is mounted, and by a connection between said rod and rock shaft for transmitting movement from the latter to the former and thereby to the movable raceway portion.

17. A spool machine as claimed in claim 15, said machine having a supporting frame, distinguished by a bracket mounted on said frame having an arm, a pivot stud mounted on said arm on which the movable part of said raceway is pivoted, said bracket having a second arm provided with a rest on which said movable raceway portion is supported.

18. A spool machine comprising in combination complemental centers for supporting and rotating a spool blank, one of said centers being movable toward and away from the other to engage blanks and release the turned spools, a tool carrying head mounted to move the tools carried thereby in a line between, and across the axis of, said centers, a raceway arranged to conduct blanks toward the space between said centers, and having its end next to the centers pivotally mounted with provision for lateral movement, connecting means between said laterally movable raceway end and one of said centers for causing the former to move with the latter, a transferring mechanism constructed and operable to carry blanks one by one from the raceway end to a position between the centers and return, said transferring mechanism being connected with the raceway end and movable laterally therewith.

19. A spool machine comprising turning centers, a tool head carrying turning or forming tools, a raceway for conducting spool blanks toward the centers, transferring mechanism for carrying blanks from said raceway to the centers in position to be engaged with the latter, a bit for boring the blanks conducted by the raceway prior to their delivery to said transferring mechanism, said bit being mounted in proximity to the raceway with provision for movement transversely of, and dogging means comprising gripping jaws arranged at respectively opposite sides of the path of the blanks and also on opposite sides of the axial line of the bit, and mechanism arranged to apply pressure equally and oppositely on the respective jaws for moving both to points equally distant from said axial line.

20. A dogging mechanism for the purpose and in the combination set forth in claim 19 in which the said mechanism for applying pressure tending to move the jaws toward an interposed blank, is constructed to limit the motion of both when the axis of the blank is in exact alinement with the boring bit.

21. In a spool machine the combination with a raceway for conducting blanks, of cooperating dogging jaws arranged on respectively opposite sides of the path in which the blanks travel in the raceway, a boring bit arranged with its axis approximately parallel to the axes of the blanks in the raceway, beside the raceway and being movable toward the same, and mechanism for moving one of said jaws across the line of travel of the blanks to engage a blank, said mechanism including means for applying pressure in the opposite direction to the complemental jaw for shifting the latter into and retaining it in a position wherein it holds the blank axially alined with the bit.

22. A dogging mechanism as set forth in claim 21 distinguished by the fact that said jaws are mounted to move in substantially opposite directions toward a common point, and by mechanism for applying such motion to said jaws connected to advance the latter equally and oppositely.

23. A dogging mechanism as set forth in claim 21 distinguished by the opposed and oppositely movable jaws, an actuator for said jaws, a link connected to said actuator and to one of the jaws, a second link connected to the actuator, and a rock lever having equal arms, one of which is connected to said link and the other of which is adapted to press against the other of said jaws.

24. A dogging mechanism as claimed in claim 23 distinguished by the fact that said rock lever is disconnected from said other jaw, and by frictional means for holding the latter in position.

25. A dogging mechanism for spool machines as claimed in claim 23 distinguished by an elastic member for transmitting force equally with provision for yielding to both said links, and means for applying force to move said member, the latter being adapted to yield when the jaws are obstructed by an interposed blank prior to the cessation of application of force by said last named means.

26. A dogging mechanism comprising a raceway adapted to contain spool blanks, sliding jaws mounted respectively above and below the raceway in line with and movable toward and from one another, means for moving one of said jaws toward the other across the line of the raceway, the other jaw being normally stationary and frictionally held in position, and a stop for determining the location of said other jaw connected with the operating means for the first jaw and moved equally and oppositely to the latter, whereby to determine the position of the jaws in said manner that blanks of all diameters grasped between them are arrested with their axes always in the same line.

27. A dogging mechanism as set forth in claim 26 distinguished by an actuating lever, a bar carried by said lever and adjustable in approximately the directions of movement of said jaws, two links pivoted to said bar, one of which is connected to the lower jaw, the other of said links being adjustable in length, and a rock lever pivoted to said second link and having an arm arranged to bear on the upper jaw and to apply pressure thereon toward the lower jaw.

28. A dogging mechanism according to claim 20 including a trip arranged and constructed to prevent penetration of the bit into the blank when the latter is held by the jaws in a position other than the intended correct position.

29. A dogging mechanism as set forth in claim 27 in which said trip comprises a projecting part associated and movable with the bit, a latch normally occupying an obstructing position in the path of said projecting part, and mechanism operable by the movement of one of said jaws into the correct blank-gripping position for displacing said latch out of its obstructing position.

30. In a spool machine the combination with a bit for centrally boring spool blanks, and dogging jaws for grasping and holding a blank with its axis alined with said bit, of a trip normally in position to stop the bit, and means operable in connection with said jaws for displacing said trip when the jaws are properly engaged with a blank.

31. In a spool machine the combination with a rotatable and endwise movable bit, a raceway extending transverse to the axis of the bit adapted to support spool blanks with their axes parallel to the bit, dogging jaws for grasping and holding blanks one at a time in alinement with the bit while the latter is advanced to bore the blank, a latch arranged to prevent advancing movement of said bit, a trigger arm connected with said latch for displacing the same, and connections associated with said dogging jaws for operating said trigger when the jaws are properly engaged with a blank to displace the latch.

32. The combination with an inclined raceway down which blanks are propelled by gravity, of a boring bit, dogging jaws for holding blanks singly in line with said bit, one of which is arranged above the raceway and the other below it, means for operating the latter to lift a blank from the raceway and engage it with the upper jaw, and a gate for arresting blanks in position to be thus engaged with the jaws, comprising an arm overlying a number of the blanks nearest to the jaws and having a down-turned end engaging the forward side of a blank in front of the one which is nearest to the line of the jaws, and a pivot mounted in fixed position beside said upper jaw, from which the arm projects and by which it is enabled to be swung upward by the rise of the blank lifted by the lower jaw, sufficiently to disengage said down turned end from the blank in front.

In testimony whereof I have affixed my signature.

HENRY N. PIERCE.